United States Patent
Stuetzler

(10) Patent No.: US 7,225,069 B2
(45) Date of Patent: May 29, 2007

(54) ARRANGEMENT FOR CONTROLLING RETAINING MEANS

(75) Inventor: Frank-Juergen Stuetzler, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/528,855

(22) PCT Filed: Mar. 4, 2003

(86) PCT No.: PCT/DE03/00696

§ 371 (c)(1),
(2), (4) Date: Sep. 22, 2005

(87) PCT Pub. No.: WO2004/028867

PCT Pub. Date: Apr. 8, 2004

(65) Prior Publication Data

US 2006/0111824 A1   May 25, 2006

(30) Foreign Application Priority Data

Sep. 23, 2002  (DE) ............................. 10 244 095

(51) Int. Cl.
*B60R 21/00* (2006.01)
(52) U.S. Cl. ............................. 701/45; 180/268; 280/735
(58) Field of Classification Search ................ 701/45, 701/46; 180/268; 280/734, 735
See application file for complete search history.

(56) References Cited

U.S. PATENT DOCUMENTS

| | | | | |
|---|---|---|---|---|
| 5,801,619 A | * | 9/1998 | Liu et al. | 340/436 |
| 6,186,539 B1 | * | 2/2001 | Foo et al. | 280/735 |
| 6,347,268 B1 | * | 2/2002 | Fujita et al. | 701/45 |
| 6,430,489 B1 | * | 8/2002 | Dalum | 701/45 |
| 6,496,764 B1 | * | 12/2002 | Wang | 701/45 |
| 2003/0160436 A1 | * | 8/2003 | Bentele-Calvoer et al. | 280/735 |

FOREIGN PATENT DOCUMENTS

| | | |
|---|---|---|
| DE | 199 55 559 | 6/2000 |
| DE | 100 10 905 | 11/2000 |
| EP | 0 987 151 | 3/2000 |

* cited by examiner

*Primary Examiner*—Mark Hellner
(74) *Attorney, Agent, or Firm*—Kenyon & Kenyon LLP

(57) ABSTRACT

A system for triggering restraint devices is proposed, which is distinguished by the fact that it combines signals from a central control unit and from upfront sensors with each other. The signals of the upfront sensor are used for adjusting time-dependent thresholds that are used to trigger the restraint devices. Usually, velocity or velocity-like signals are used in this context. Velocity-like signals are ascertained by filtering, a low frequency filtering being provided in this case.

4 Claims, 6 Drawing Sheets

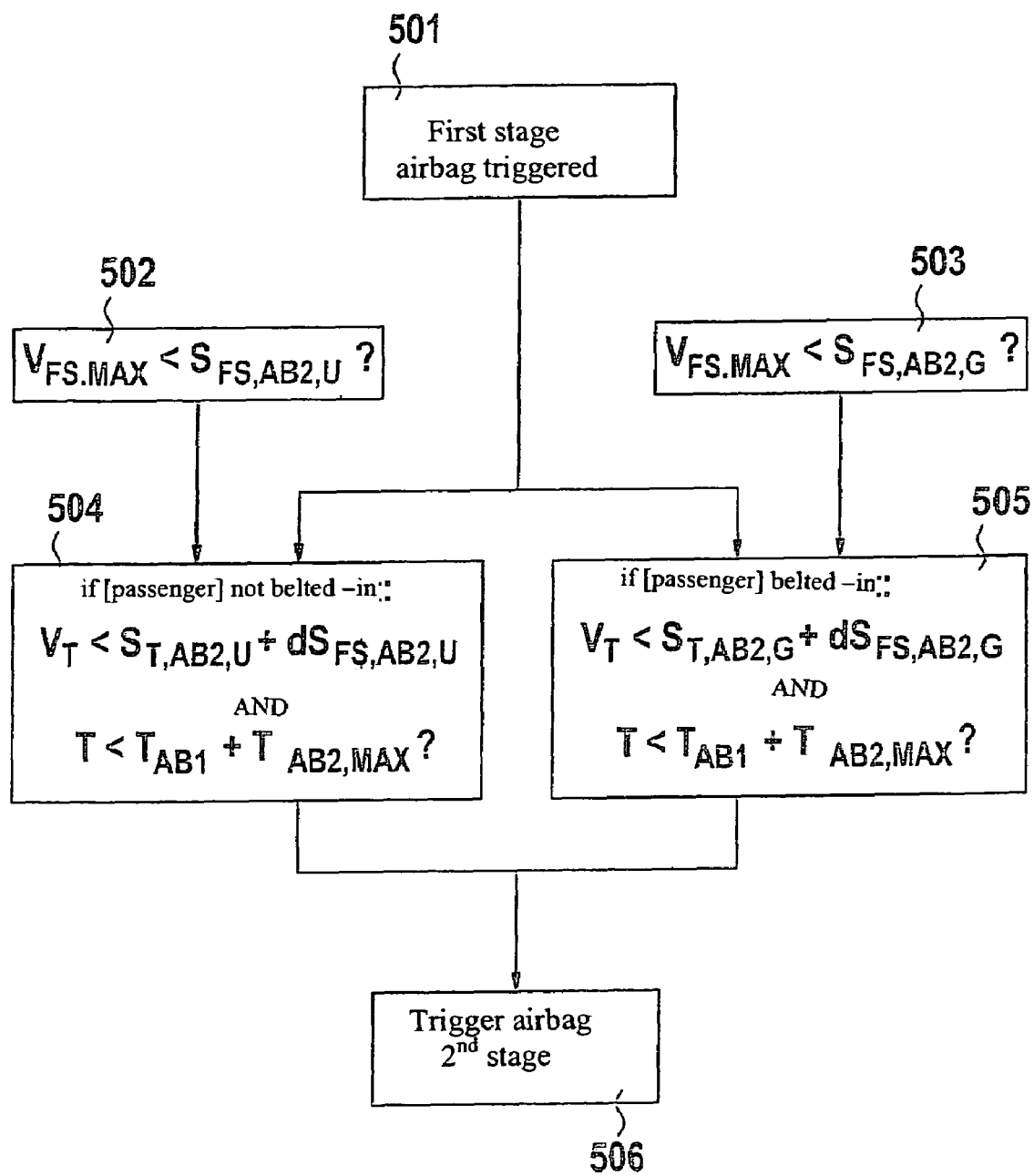

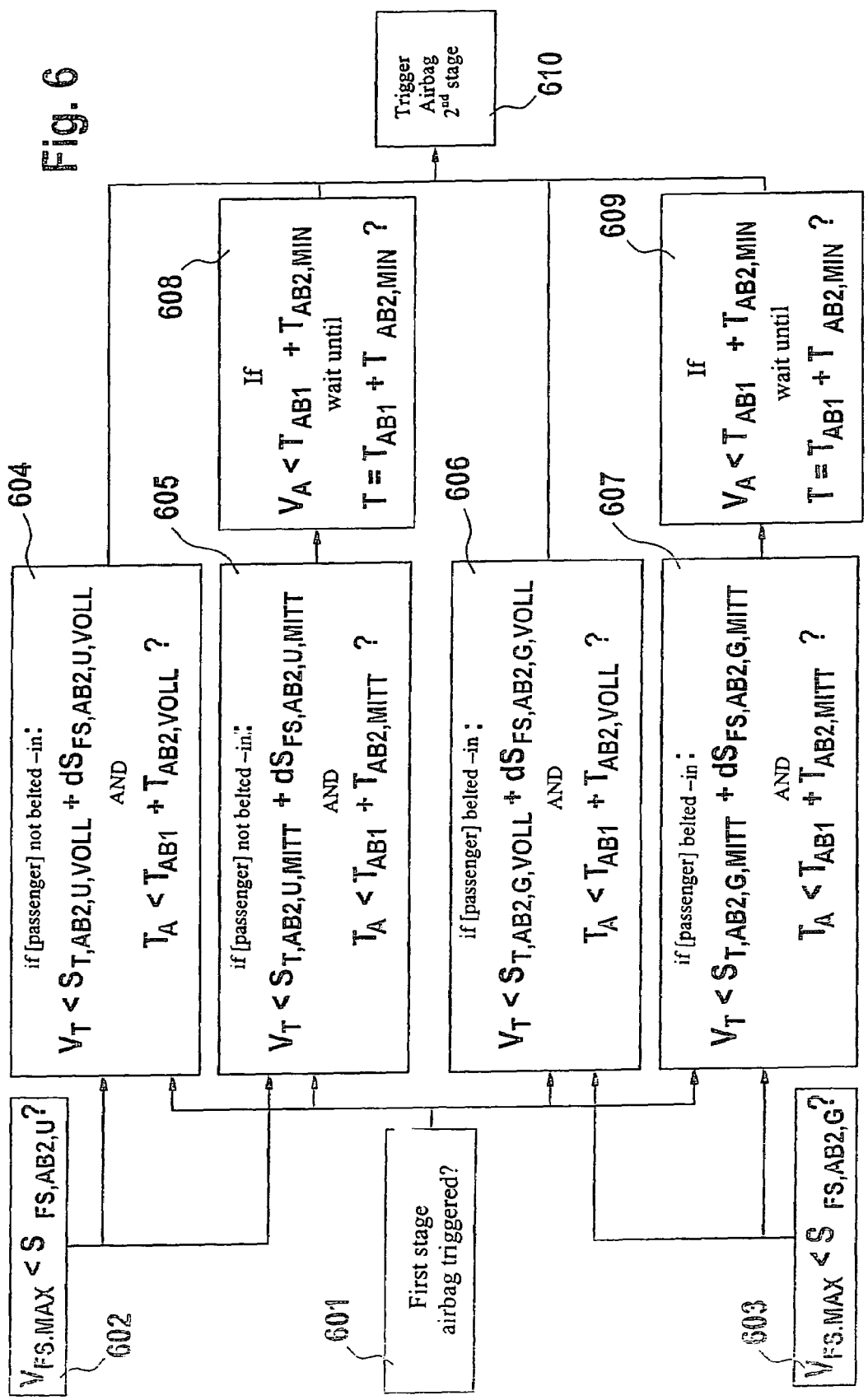

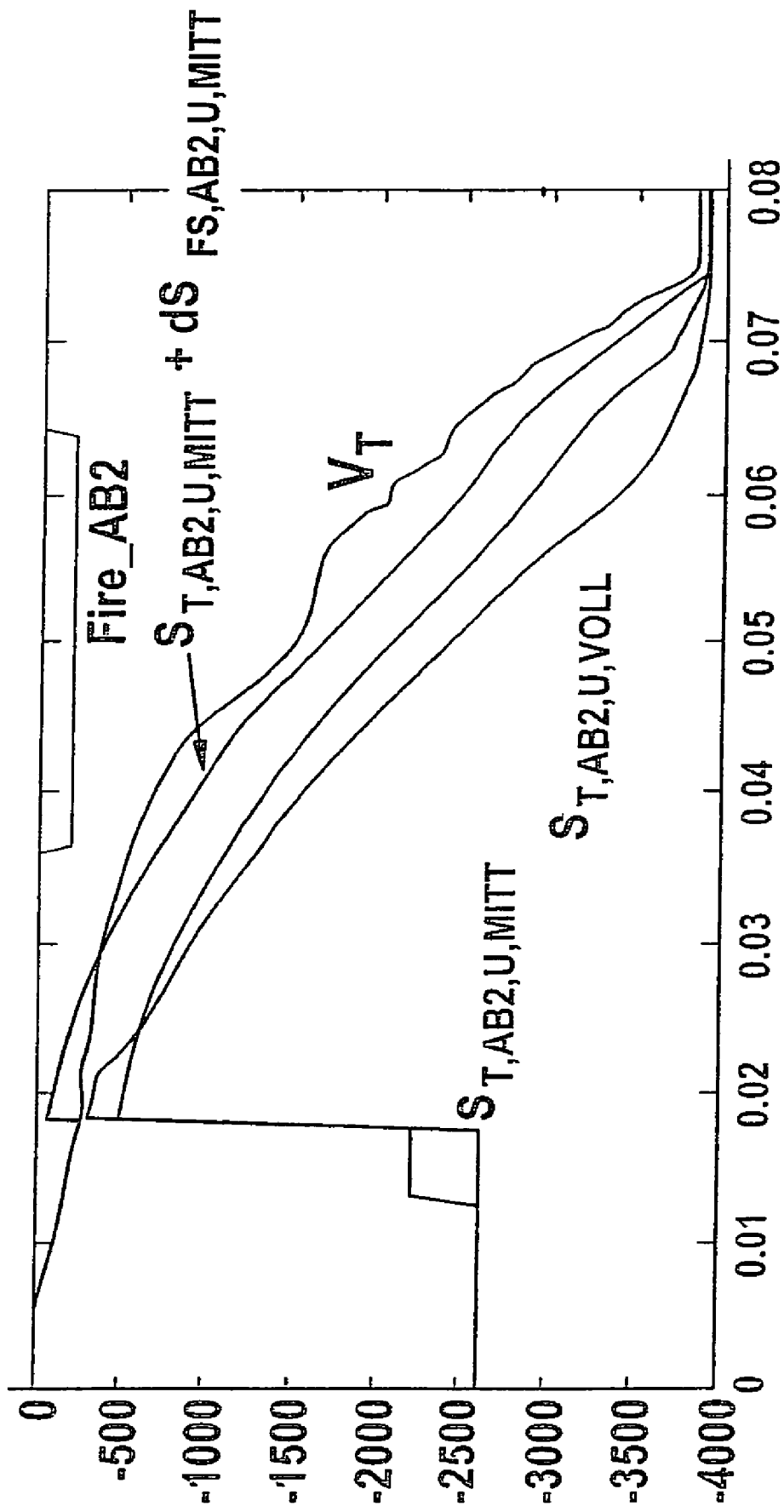

ARRANGEMENT FOR CONTROLLING RETAINING MEANS

FIELD OF THE INVENTION

The present invention relates to a system for triggering restraint devices.

SUMMARY OF THE INVENTION

The system according to the present invention for triggering restraint devices has the advantage of achieving faster triggering times for the restraint devices, that is, both for belt tensioners as well as for airbag stages, due to the powerful role of the upfront sensor. Here it is possible in particular to trigger specifically an airbag having two stages. This powerful role of the upfront sensor finds particular expression in the fact that, following the signals of the upfront sensor, time-dependent thresholds, which result in the triggering of the restraint devices, are modified. Here an upfront sensor is particularly of great advantage since in the event of a frontal crash it is very close to the event of the accident and thus provides better information than a sensor that is located merely in the centrally situated control unit normally does.

Particularly advantageous is the fact that here only velocity signals or filtered acceleration signals are used. The integration or filtering provides a smoothing which results in more meaningful signals.

In this instance, signals of low frequency are used in particular, i.e. a maximum limit frequency of 100 Hz is used for filtering. These signals are more reliable than signals of higher frequency, since signals of lower frequency can be more easily simulated, particularly by using a finite element method. The use of a finite element simulation can significantly save costs in the prototype phase of automobile development.

BRIEF DESCRIPTION OF THE DRAWINGS

FIG. 5 shows a further block diagram for illustrating the functional sequence according to the present invention FIG. 6 shows another block diagram for illustrating the functional sequence according to the present invention.

FIG. 7 shows another velocity-time diagram showing an example for the functional sequence that is executed in the system of the present invention.

DETAILED DESCRIPTION

Restraint systems determine an activation or triggering of restraint devices using the acceleration that is measured in the passenger compartment on the tunnel and using peripheral sensors in the outer region, for example in the B-posts. This limits the use of finite element simulations for calculating the acceleration in the event of an accident, for such simulation methods have problems correctly simulating nonlinear processes in the event of a breakage of structural parts. For this reason, in the higher frequency signal range above typically 100 Hz, calculated acceleration signals are not reliable enough for use in the system calibration of a crash detection algorithm.

According to the present invention, a system is described, which decides the triggering of airbags and belt tensioners on the basis of measured velocities or accelerations and which provides results comparable to conventional, acceleration-based algorithms. Particularly the use of front sensors, that is, upfront sensors, which are built into the crash crumple zone of a vehicle, allows for such a use of a velocity-based algorithm.

Thus it is the essence of the present invention that the triggering of the restraint devices with the aid of a filtered acceleration, which is decided to a velocity-like signal or to the velocity itself. The velocity is measured in the passenger compartment on the tunnel and in the crash crumple zone of the vehicle with the aid of acceleration sensors. The advantage is that the algorithm calculates using low frequency signals, which in turn can be calculated quite reliable using finite element simulation. The present invention therefore permits the use of finite element simulation for the system calibration of airbags and belt tensioners. This makes it possible to save significant costs in the prototype phase of an automobile development.

Figure 1:
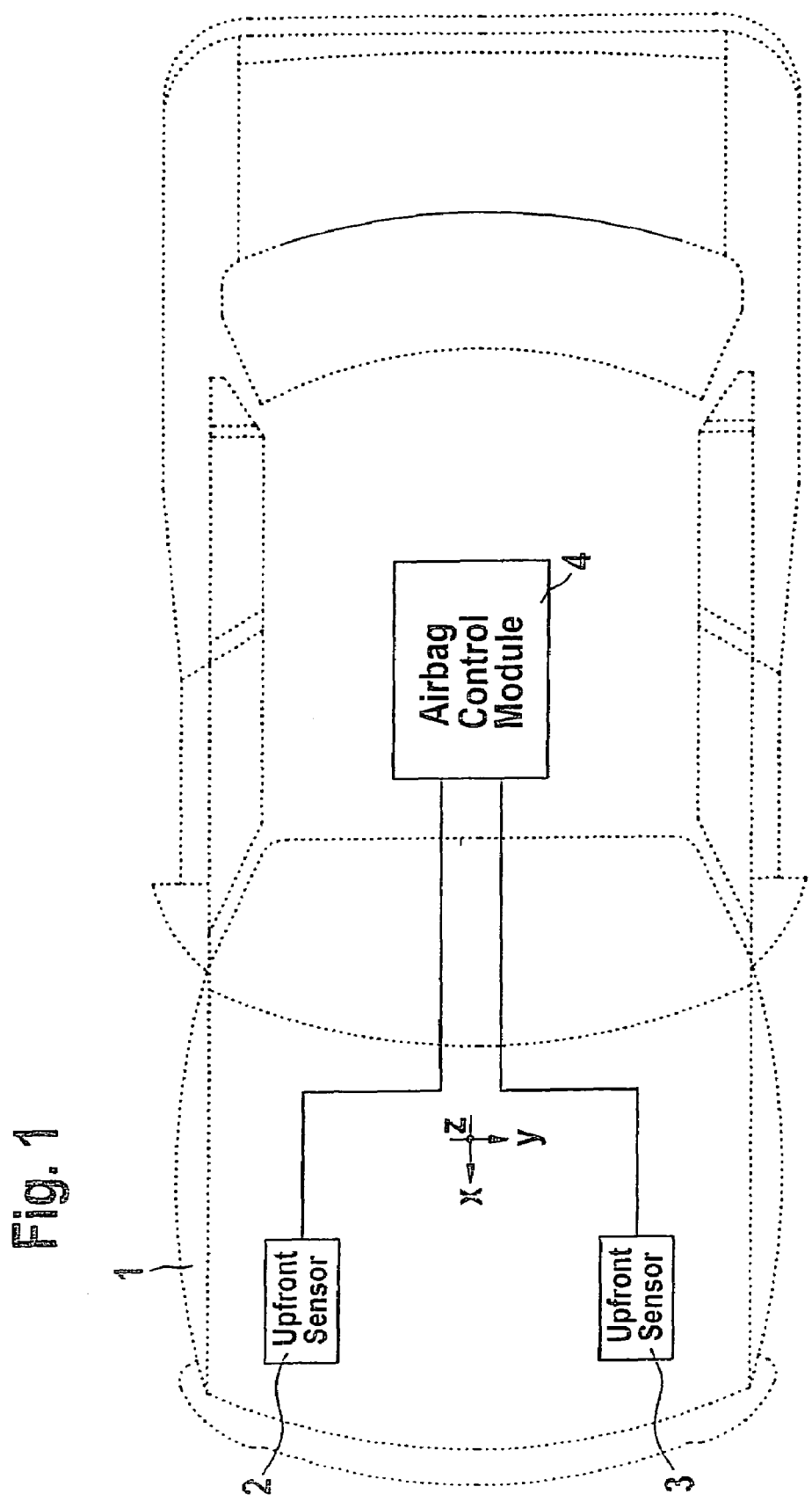
FIG. 1 shows a block diagram of the system according to the present invention.

FIG. 1 shows that sensors 2 and 3 are used as upfront sensors in the crash crumple zone of a vehicle. Sensors 2 and 3 are connected to a control unit 4, which triggers restraint devices. Control unit 4 is centrally located in the vehicle, preferably on the tunnel. Upfront sensors 2 and 3 are usually located on the cross support of the radiator and measure the acceleration in the event of an accident. From this acceleration, the velocity is established by integration for the respective sensor 2 and 3 or a velocity-like filtered acceleration is produced for example by low-pass filtering using a suitable low limit frequency of up to 100 Hz. These velocities and/or filtered accelerations are compared to thresholds. If the thresholds are exceeded, logical signals are generated by which other thresholds are changed. When specific thresholds are exceeded and/or when a logical signal is produced from the combination of the logical signals of the exceedance of specific thresholds, the associated restraint devices are triggered.

The transmission of the acceleration signals of upfront sensors 2 and 3 to control unit 4 usually occurs digitally, preferably via a unidirectional line, which is respectively provided for each sensor. Alternatively, a sensor bus may be used for this purpose. Control unit 4 itself performs the evaluation of the measured acceleration, that is, the integration or filtering and the threshold comparison. To this end, control unit 4 normally has a microprocessor or microcontroller with an appropriate storage device.

Figure 2:
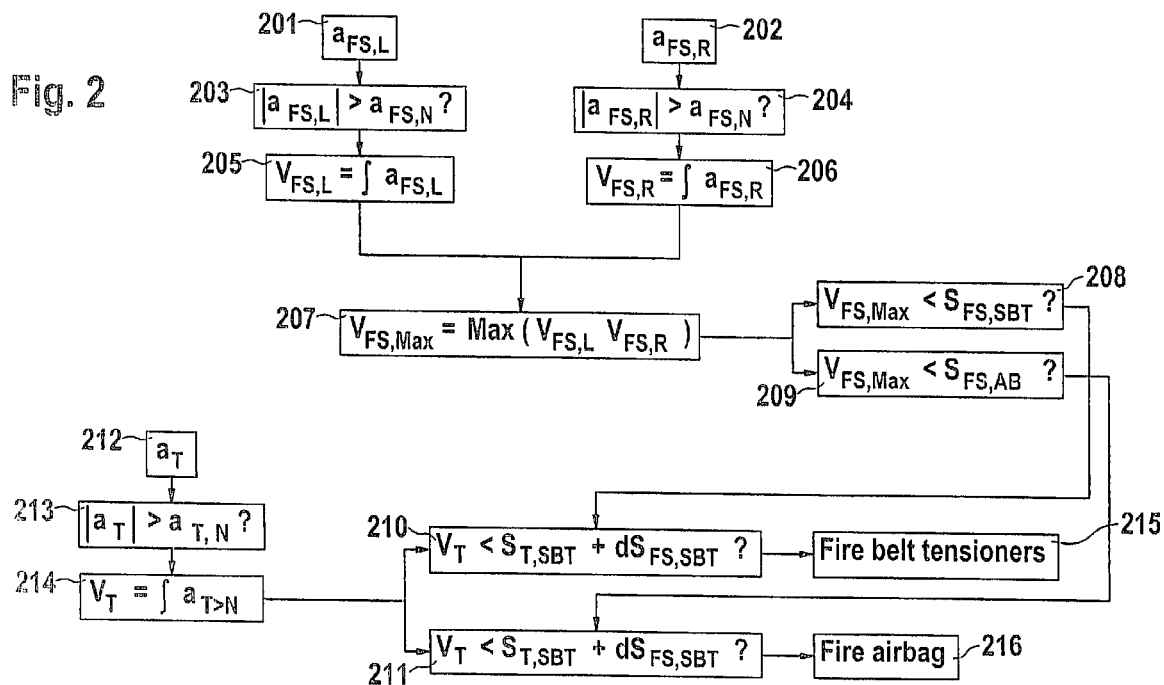
FIG. 2 shows a block diagram of a functional sequence according to the present invention.
Figure 3:
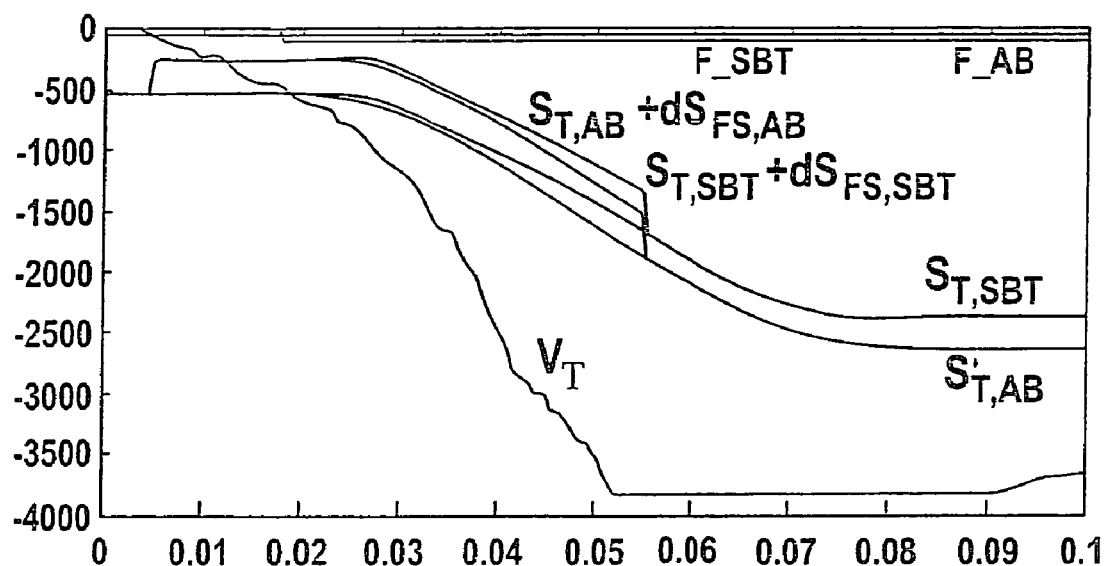
FIG. 3 shows a velocity-time diagram showing an example of the functioning of the system according to the present invention.

FIG. 2 shows in a block diagram an example of a velocity-based algorithm. The acceleration $a_T$ measured on the tunnel is generated in block 212. The magnitude of this acceleration $a_T$ is compared in block 213 with an adjustable threshold $a_{T,N}$. If the magnitude of $a_T$ lies above that of $a_{T,N}$, then the velocity $V_T$ is generated in block 214 by an integration of $a_T$. If the magnitude of measured acceleration $a_T$ lies below threshold $a_{T,N}$, then velocity $V_T$ is increased by an adjustable magnitude $a_{T,R}$ until velocity $V_T$ is equal to zero. Acceleration $V_T$ measured in the passenger compartment on the tunnel is compared with a time-dependent threshold in blocks 210 or 211. In the most simple case, the restraint devices corresponding to this threshold are triggered when the threshold is undershot. In block 210, this is implemented by way of example for the first stage of an airbag. Here multiple adjustable thresholds are provided to trigger corresponding restraint devices. Hence there is a threshold $S_{T,SBT}$ in block 211 for triggering belt tensioners and a threshold $S_{T,AB1}$ in block 210 for triggering the first stage of the two-stage airbag. FIG. 3 shows velocity $V_T$, thresholds having triggering flags for the example of a 50 km/h head-on collision against a rigid barrier.

Figure 4:
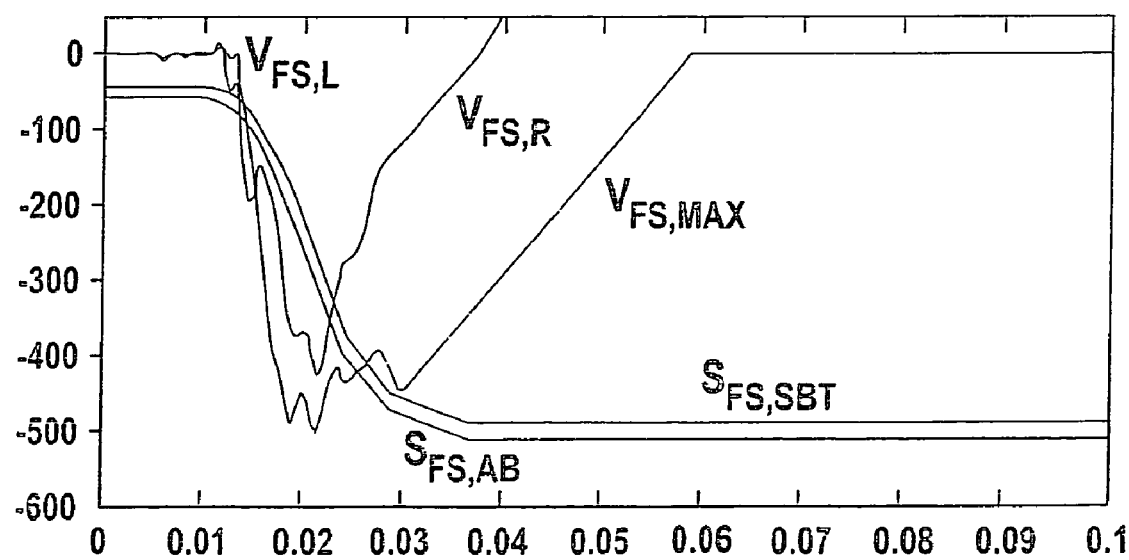
FIG. 4 shows a second example in a velocity-time diagram.

This threshold value comparison, however, is also determined by the accelerations of front sensors 2 and 3. In FIG. 2, the accelerations are in each case measured in blocks 201 and 202 by the two upfront sensors 2 and 3 $a_{FS,L}$ and $a_{FS,R}$. These in turn are compared in blocks 203 and 204 to an adjustable threshold $a_{FS,N}$. If they lie above it, the velocity is determined by a suitable integration in blocks 205 and 206. If they lie below threshold $a_{FS,N}$, then velocity $V_{FS,L}$ is increased by an adjustable magnitude $a_{FS,Red}$ until velocity $V_{FS,L}$ is equal to zero. This applies to both sensor signals. A determination is then made in block 207 as to which of the two velocities of the right and left upfront sensors is the maximum velocity. The maximum is then compared in blocks 208 and 209 to individually adjustable thresholds $S_{FS,SBT}$ for the belt tensioner and $S_{FS,AB}$ for the airbag. Additional thresholds may be provided here, according to the existing restraint devices. If the maximum velocity determined by the front sensors undershoots thresholds $S_{FS,SBT}$ and $S_{FS,AB}$, then the associated thresholds in blocks 210 and 211 $S_{T,SBT}$ and $S_{T,AB}$ are raised by specific adjustable magnitudes $dS_{T,SBT}$ and $dS_{T,AB}$. In this manner, the triggering of the associated restraint devices is facilitated. The probability of undershooting these thresholds is then higher. FIG. 4 shows an example for velocities and thresholds, measured on the right and left radiator support, for a 50 km/h head-on collision against a rigid barrier. The changes of the triggering thresholds resulting from this are represented in FIG. 3.

The continuation of the algorithm for controlling the second stage of two-stage gas generators is shown in the block diagram in FIG. 5. If a triggering of the first airbag stage was detected in block 501, then velocity $V_T$ determined in the passenger compartment on the tunnel in turn is compared with time-dependent thresholds $S_{T,AB2,U}$, $S_{T,AB2,G}$ for passengers who are not belted-in and passengers who are belted-in. If thresholds $S_{T,AB2,U}$ and $S_{T,AB2,G}$ have been exceeded within a specific maximum time delay $T_{AB2,max}$ following the triggering of the first stage, then a decision is made to trigger the second stage for passengers who are not belted-in or for passengers who are belted-in, and the second stage is triggered. Whether passengers are belted-in or not belted-in is detected in blocks 502 and 503. In the event that the passenger is not belted-in, the threshold value comparison and the maximum time delay are verified in block 504. In block 505, this is done for the case where the passenger is belted-in. If a trigger signal comes about in one of blocks 504 or 505, then the second stage is triggered in block 506. If this maximum delay time is exceeded, then the crash detection algorithm no longer triggers the second stage.

In another variant, represented schematically in FIG. 6, there are two triggering thresholds $S_{T,AB2,U,VOLL}$ and $S_{T,AB2,U,MITT}$ for the case of passengers who are not belted-in. If velocity $V_T$ determined on the tunnel undershoots the threshold $S_{T,AB2,U,VOLL}$ UP to a minimum delay time $T_{AB,VOLL}$, typically 5 msec following the decision to trigger the first stage, then a decision is made to trigger the second gas generator stage, namely, at the time of the undershooting. If velocity $V_T$ determined on the tunnel falls below threshold $S_{T,AB2,U,MITT}$ up to a maximum adjustable delay time $T_{AB2}$ of typically 20 to 50 ms following the decision to trigger the first stage, then a decision is made to trigger the second stage at the time of the decision at the earliest following a second adjustable delay time following the triggering of the first stage $T_{AB2,min}$, typically 20 ms. If this maximum delay time is exceeded, then the crash detection algorithm no longer triggers the second stage. In the case of passengers who are belted-in, the method remains the same using appropriate thresholds.

Velocity $V_{FS,L}$ and $V_{FS,R}$ determined by the front sensors may in turn be used to improve the control of the second gas generator stage. The maximum $V_{FS,max}$ of the two velocities $V_{FS,L}$ and $V_{FS,R}$ is in turn compared to time-dependent adjustable thresholds $S_{FS,AB2,U}$, $S_{FS,AB2,G}$. If the maximum front sensor velocity $V_{FS,max}$ distinguishes the thresholds $S_{FS,AB2,U}$ and $S_{FS,AB2,G}$, then the associated thresholds $S_{T,AB2,U,VOLL}$, $S_{T,AB2,U,MITT}$ or $S_{T,AB2,G,VOLL}$, $S_{T,AB2,G,MITT}$ are increased by specific adjustable magnitudes $dS_{FS,AB2,U,voll}$ and $dS_{FS,AB2,U,mitt}$ or $dS_{FS,AB2,G,voll}$ and $dS_{FS,AB2,G,mitt}$. In this manner, the triggering of the associated restraint devices is facilitated.

FIG. 6 shows block 601, in which the triggering of the first stage was decided. Blocks 602 and 603 detect for the front sensors whether the threshold has been undershot in the case where the passenger is belted-in and in the case where the passenger is not belted-in. If the front sensor thresholds are undershot, then the threshold values are changed in blocks 604, 605, 606 and 607. In block 604, the threshold value comparison is performed for the case in which the passenger is not belted-in and the time condition for the early triggering of the second stage is verified. If the time condition was maintained and the threshold value undershot, then the system branches to block 610 to trigger the second stage. In block 605, the threshold comparison is performed and the time condition is verified for the case of delayed triggering. If the time condition was maintained and the threshold value was undershot, then the system branches to block 608 and a check is performed as to whether the minimum waiting time has elapsed and, if this still is not the case, the system waits until it has elapsed. Then the system branches to block 610 to trigger the second stage. In block 606, the threshold value comparison is performed for the case in which the passenger is belted-in and the time condition for the early triggering of the second stage is verified. If the time condition was maintained and the threshold value undershot, then the system branches to block 610 to trigger the second stage. In block 607, the threshold comparison is performed and the time condition is verified for the case of delayed triggering in the case in which the passenger is belted-in. If the time condition was maintained and the threshold value was undershot, then the system branches to block 609 and a check is performed as to whether the minimum waiting time has elapsed and, if this still is not the case, the system waits until it has elapsed. Then the system branches to block 610 to trigger the second stage.

An example for velocity and thresholds for the above-described second variant of the control of the second gas generator stage is shown in FIG. 7 for a 64 km/h offset crash test against a deformable barrier for the case of a passenger who is not belted-in. The triggering time of the first generator stage in this example is approximately 18 ms following the beginning of the crash. The threshold $S_{T,AB2,U,VOLL}$ in this example is not changed by front sensors, but threshold $S_{T,AB2,U,MITT}$ is changed by front sensors approximately 12 ms following the beginning of the crash and thus increases $S_{T,AB2,U,MITT}$ plus $dS_{FS,AB2,U,mitt}$. Velocity $V_T$ exceeds threshold $S_{T,AB2,U,VOLL}$, not, however, $S_{T,AB2,U,MITT}$ plus $dS_{FS,AB2,U,mitt}$ at approximately 18 ms. The decision for triggering the second stage is in this case made at 18 ms following the beginning of the crash. In this case, however, the second stage is triggered only after 20 ms following the triggering of the first stage, that is, at 38 ms. This can be seen from the triggering flag Fire_AB2, which is set at 38 ms.

In another variant for controlling the second gas generator stage, instead of velocity $V_T$ on the tunnel, the difference of the velocities $V_T$-$V_{FS,max}$ is calculated and compared with the thresholds as described above.

In yet another variant, instead of the velocity $V_T$ on the tunnel, the acceleration filtered by a low-pass filter is calculated and compared with the thresholds as described above. The acceleration of the front sensors is likewise filtered by a low-pass filter and compared with the thresholds as described above. The filter frequency of the low-pass filter is adjustable depending on the type of installation and is chosen in such a way that a velocity-like signal is generated. A low filter frequency in the order of magnitude of up to 120 Hz or 100 Hz is chosen for this purpose.

In another variant for controlling the second gas generator stage, velocity $V_T$ on the tunnel is compared to thresholds, as described above, in order to control the second gas generator stage. In parallel, on the tunnel the acceleration filtered by a low-pass filter is calculated and compared to time-dependent thresholds as described above. The decision of both branches is joined by a logical OR and is used for controlling the second stage.

The invention claimed is:

1. A device for triggering a restraint device, comprising:
   a control unit for placement in a central location in a vehicle having at least one acceleration sensor and a plurality of upfront sensors, wherein:
   the control unit triggers the restraint device if specific derived signals of the at least one acceleration sensor and of the upfront sensors exceed specific thresholds,
   the control unit changes the specific thresholds as a function of the signal of at least one of the upfront sensors,
   the control unit uses a maximum of the signals of the upfront sensors for changing the respective thresholds,
   the restraint device includes a two-stage restraint device,
   first and second stages of the two-stage restraint device are triggered if the signal of the acceleration sensor exceeds the threshold values associated with the upfront sensors, and
   the threshold values associated with the upfront sensors are changed as a function of the maximum, wherein the threshold values are time dependent.

2. The device as recited in claim 1, wherein the control unit forms in each case velocity signals from the signals of the at least one acceleration sensor and at least one of the upfront sensors for a comparison with the respective thresholds.

3. The device as recited in claim 1, further comprising:
   an arrangement for filtering the signal of the acceleration sensor in accordance with an upper limit frequency of up to 100 Hz for forming velocity-like signals.

4. The device as recited in claim 1, wherein the threshold values are raised by specific adjustable magnitudes depending on an undershooting of a maximum velocity determined by the upfront sensors.

* * * * *